United States Patent
Kou et al.

(10) Patent No.: US 11,918,971 B1
(45) Date of Patent: Mar. 5, 2024

(54) LITHIUM ADSORBENT AND PREPARATION METHOD THEREFOR

(71) Applicant: SUNRESIN NEW MATERIALS CO.LTD., Shaanxi (CN)

(72) Inventors: Xiaokang Kou, Xi'an (CN); Suidang Li, Xi'an (CN); Pengwei Jiao, Xi'an (CN); Qiong Liu, Xi'an (CN)

(73) Assignee: SUNRESIN NEW MATERIALS CO. LTD., Xi'an (CN)

( * ) Notice: Subject to any disclaimer, the term of this patent is extended or adjusted under 35 U.S.C. 154(b) by 0 days.

(21) Appl. No.: 18/236,609

(22) Filed: Aug. 22, 2023

(30) Foreign Application Priority Data

Aug. 11, 2023 (CN) .......................... 202311013817.8

(51) Int. Cl.
 *B01J 20/04* (2006.01)
 *B01J 20/28* (2006.01)
 *B01J 20/30* (2006.01)

(52) U.S. Cl.
 CPC ....... *B01J 20/043* (2013.01); *B01J 20/28004* (2013.01); *B01J 20/28061* (2013.01); *B01J 20/28064* (2013.01); *B01J 20/28073* (2013.01); *B01J 20/2808* (2013.01); *B01J 20/28083* (2013.01); *B01J 20/3028* (2013.01)

(58) Field of Classification Search
 CPC ................ B01J 20/043; B01J 20/28004; B01J 20/28061; B01J 20/28073; B01J 20/2808; B01J 20/28083; B01J 20/3028
 See application file for complete search history.

(56) References Cited

FOREIGN PATENT DOCUMENTS

| CN | 1511964 A | * | 7/2004 |
|---|---|---|---|
| CN | 101955210 A | | 1/2011 |
| CN | 102631897 A | | 8/2012 |
| CN | 108722341 A | | 11/2018 |
| CN | 109225124 A | | 1/2019 |
| CN | 112871127 A | | 6/2021 |
| CN | 113996274 A | | 2/2022 |
| CN | 114768775 A | | 7/2022 |
| CN | 115155528 A | | 10/2022 |
| JP | 2003-146651 A | | 5/2003 |

OTHER PUBLICATIONS

International Search Report and Written Opinion of the International Searching Authority dated Dec. 7, 2023 as received in Application No. PCT/CN2023/117069.

* cited by examiner

*Primary Examiner* — Yong L Chu
(74) *Attorney, Agent, or Firm* — Maschoff Brennan

(57) ABSTRACT

Disclosed in the present disclosure are a lithium adsorbent and a preparation method therefor. The lithium adsorbent has a porous structure, and includes an aluminum-based lithium adsorbent active material and a hydrophilic binder; and the lithium adsorbent has an average pore diameter ranging from 1 nm to 10 nm, a pore volume ranging from 0.65 ml/g to 0.8 ml/g, and a specific surface area ranging from 400 $m^2/g$ to 600 $m^2/g$. The lithium adsorbent of the present disclosure has a specific average pore size ranging from 1 nm to 10 nm, lithium ions have a diameter of 0.3 nm, and the pore size of the lithium adsorbent of the present disclosure is three times or more greater than the diameter of the ions so that the lithium ions can quickly enter and exit pores. Therefore, the structure can ensure high adsorption efficiency and high desorption efficiency at a high flow rate, and allows desorption to be more concentrated than that of a general lithium adsorbent to reduce tailing, and can effectively improve the lithium production efficiency. Moreover, the product of the present disclosure has a pore size of less than 10 nm, allowing the lithium adsorbent to have a low dissolution loss rate and a long service life, and the lithium adsorbent of the present disclosure still has high adsorption efficiency and high desorption efficiency after 1000 cycles of adsorption and desorption.

13 Claims, No Drawings

LITHIUM ADSORBENT AND PREPARATION METHOD THEREFOR

TECHNICAL FIELD

The present disclosure belongs to the field of lithium extraction by adsorption, and in particular relates to a lithium adsorbent and a preparation method therefor.

BACKGROUND

Lithium is the lightest metal element in the world, and a lithium metal can be widely used in the fields of rechargeable batteries, glass, ceramics, alloys, lubricants, medicines, and the like. Lithium resource reserves in salt lake brines account for 70-80% of the total amount of lithium resources, and extraction of lithium from the salt lake brines is a dominant direction of lithium salt production at present. Li-containing salt lake brine resources in China are mostly high Mg/Li ratio brines, and a high concentration of divalent Mg ions makes a technology of separating Li ions more complex and becomes a technical bottleneck of extracting lithium from brine.

Lithium adsorbents commonly used for separation of lithium from magnesium in current production are aluminum-based lithium adsorbents. An aluminum-based lithium adsorbent in the prior art is typically prepared by first preparing a precursor $LiCl·2Al(OH)_3·nH_2O$, then performing drying and pulverizing, and then performing granulation molding together with a binder. The preparation steps are more and the process is complex. Moreover, a pore size is generally larger in the existing disclosed patents, which will result in reduced adsorption efficiency and reduced mechanical strength.

Therefore, at present, the aluminum-based lithium adsorbents generally have shortcomings such as low adsorption efficiency, low concentration of eluate, and high dissolution loss, which have become technical problems that need to be solved urgently in the field of lithium extraction from salt lakes at present.

SUMMARY

The present disclosure proposes a lithium adsorbent, wherein the lithium adsorbent has a pore structure with an average pore diameter ranging from 1 nm to 10 nm, and the structure can ensure high adsorption efficiency and high desorption efficiency at a high flow rate, and allows desorption to be more concentrated than that of a general lithium adsorbent to reduce tailing. The present disclosure adopts the following technical solutions:

provided is a lithium adsorbent, wherein the lithium adsorbent has a porous structure and includes an aluminum-based lithium adsorbent active material and a hydrophilic binder;

the lithium adsorbent has an average pore diameter ranging from 1 nm to 10 nm, a pore volume ranging from 0.65 ml/g to 0.8 ml/g, and a specific surface area ranging from 400 $m^2$/g to 600 $m^2$/g.

Optionally, the lithium adsorbent has a particle size ranging from 0.8 mm to 2.0 mm.

Optionally, the hydrophilic binder is at least one of polyacrylamide, polyacrylate, dextran, agarose, polyvinyl alcohol and phenolic resin.

A method for preparing the above lithium adsorbent includes the steps of:

uniformly mixing raw materials including a lithium compound, an aluminum compound, a pore-forming agent, a hydrophilic binder and water, and carrying out a reaction at a temperature ranging from 60° C. to 100° C. for 2 h to 4 h so that the lithium compound reacts with the aluminum compound to form an aluminum-based lithium adsorbent active material; wherein a ratio of a total weight of the lithium compound, the aluminum compound and the hydrophilic binder to a weight of the pore-forming agent is 100:(0.6 to 20); and curing the hydrophilic binder in the raw material mixture, and performing granulating and drying to obtain the lithium adsorbent.

Preferably, the ratio of the total weight of the lithium compound, the aluminum compound and the hydrophilic binder to the weight of the pore-forming agent is 100:(2 to 12).

Optionally, the aluminum compound is at least one of aluminum chloride, aluminum nitrate, aluminum sulfate, aluminum carbonate, aluminum hydroxide, aluminum oxide and alumina sol.

Optionally, the lithium compound is at least one of lithium chloride, lithium carbonate and lithium hydroxide.

Optionally, the pore-forming agent is an organic pore-forming agent which is at least one of polyvinylpyrrolidone, polyethylene glycol, a Span emulsifier and a Tween emulsifier.

Optionally, the polyvinylpyrrolidone adopts PVP K30 and the polyethylene glycol adopts PEG2000.

The raw materials contain chloride ions.

The aluminum-based lithium adsorbent active material refers to a $LiCl·2Al(OH)_3·nH_2O$ material.

Optionally, the raw materials further include a filler, wherein a ratio of the total weight of the lithium compound, the aluminum compound and the hydrophilic binder to a weight of the filler is 100:(0 to 20); and a ratio of a total weight of the lithium compound, the aluminum compound, the hydrophilic binder and the filler to the weight of the pore-forming agent is 100:(0.6 to 20).

Preferably, the ratio of the total weight of the lithium compound, the aluminum compound, the hydrophilic binder and the filler to the weight of the pore-forming agent is 100:(2 to 12).

Optionally, the filler is at least one of lithium ore, aluminum ore and a lithium adsorbent secondary recycling material; and optionally, the filler has a particle size of less than 0.15 mm.

Optionally, the lithium adsorbent secondary recycling material is particles of less than 0.8 mm obtained from the granulating process of the lithium adsorbent.

Optionally, the hydrophilic binder is at least one of polyacrylamide, polyacrylate, dextran, agarose, polyvinyl alcohol and phenolic resin.

Optionally, the raw materials further include a curing agent, wherein the curing agent is selected from at least one of azobisisobutyronitrile, potassium persulfate, ammonium persulfate, sulfuric acid, hydrochloric acid, sodium hydroxide, a dialdehyde compound and epichlorohydrin.

Optionally, the dialdehyde compound includes at least one of glyoxal, malondialdehyde, succinaldehyde, glutaraldehyde and adipaldehyde.

Optionally, a weight ratio of the curing agent to the binder is 1:(1 to 10).

Optionally, a molar ratio of the lithium compound to the aluminum compound is 1:(2 to 6).

Optionally, a ratio of a total weight of the lithium compound and the aluminum compound to a weight of the hydrophilic binder is 100:(5 to 25).

Optionally, a ratio of a total weight of the lithium compound and the aluminum compound to a weight of the water in the raw materials is 1:(1 to 2.5).

Optionally, the drying is performed at a temperature ranging from 80° C. to 150° C.

Optionally, a device used for the curing is a double-cone dryer or a kneader.

Optionally, a device used for the granulating is a counter-roll granulator or a screw extrusion granulator.

Optionally, a device used for the drying is a tunnel-type hot air circulating tunnel electric heating apparatus or a rotary kiln.

The curing device described above allows the cured product to have higher toughness by precisely controlling the reaction temperature and time, thereby improving the yield of a finished product of a qualified grain size; the drying device can achieve zoned temperature control to allow an intermediate polymerization molding process to be controlled to gradually form a target pore size. The pore-forming agent can support the pore structure during polymer curing, and after water washing, the pore-forming agent is replaced with water, and the pore structure still remains. Due to high cost of lithium raw materials at present, after multiple experiments, the addition of a ground lithium ore filler, a ground aluminum ore filler, and a finished product filler of a small particle size can not only reduce the cost, but also recycle the waste. In conclusion, the selected curing device, granulating device, and drying device can effectively improve the production efficiency of the curing, granulating, and drying processes, reduce manpower, improve lithium production and yield, and effectively reduce costs.

The technical solutions of the present disclosure have the following advantages:

1. The lithium adsorbent of the present disclosure has a specific average pore size ranging from 1 nm to 10 nm, lithium ions have a diameter of 0.3 nm, and the pore size of the lithium adsorbent of the present disclosure is three times or more greater than the diameter of the ions so that the lithium ions can quickly enter and exit pores. Therefore, the structure can ensure high adsorption efficiency and high desorption efficiency at a high flow rate, and allows desorption to be more concentrated than that of a general lithium adsorbent to reduce tailing concentration, and can effectively improve the lithium production efficiency. Moreover, the product of the present disclosure has a pore size of less than 10 nm, allowing the lithium adsorbent to have a low dissolution loss rate and a long service life, and the lithium adsorbent of the present disclosure still has high adsorption efficiency and high desorption efficiency after 1000 cycles of adsorption and desorption.

2. The preparation method according to the present disclosure employs a one-step method in which raw materials of aluminum and lithium are directly cured together with water and a binder without first synthesizing a precursor from the raw materials of aluminum and lithium. One-step forming greatly simplifies the preparation process, improves the production efficiency and reduces the production cost.

DETAILED DESCRIPTION

The following examples are provided for a better further understanding of the present disclosure, are not limited to the best embodiments, and do not limit the contents and scope of protection of the present disclosure. Any product identical to or similar to the present disclosure obtained by anyone under the inspiration of the present disclosure or by combining the present disclosure with other features in the prior art falls within the scope of protection of the present disclosure.

Specific experimental steps or conditions are not specified in the examples, they can be performed according to the operations or conditions of conventional experimental steps described in the literature in the field. The used reagents or instruments of which a manufacturer is not indicated are conventional commercially available reagent products.

Example 1

In a 1000 L reactor, 500 kg of water, 260 kg of aluminum chloride hexahydrate, 17.5 kg of lithium carbonate, 40.5 kg of PVP K30, 100 kg of sodium hydroxide, 62 kg of acrylamide, and 7 kg of N,N-methylenebisacrylamide were added, and a reaction was carried out under stirring under normal pressure at 60° C. for 2 h. The above slurry was transferred to a 2000 L double-cone dryer, and 0.2 kg of potassium persulfate was added, stirring was started for uniform mixing, heating was performed to 60° C., a reaction was carried out for 2 h, then a material was discharged, and transferred to a counter-roll granulator to be cut to a size ranging from 0.8 mm to 2.0 mm, and the cut intermediate was transferred to a tunnel-type hot air circulating tunnel electric heating apparatus to be dried at 90° C. to a water content of less than 5% (w/w) to obtain a finished product.

Example 2

In a 1000 L reactor, 500 kg of water, 400 kg of aluminum nitrate nonahydrate, and 8.75 kg of lithium carbonate were added, hydrochloric acid was added for neutralizing to pH=6, 15 kg of span 65, and 40 kg of polyvinyl alcohol 0599 were added, and the mixture was stirred at 80° C. for 2 h. The above slurry was transferred to a 2000 L kneader, and 5 kg of borax was added, stirring was started for uniform mixing, heating was performed to 70° C., a reaction was carried out under normal pressure for 2 h, a material was discharged, and transferred to a counter-roll granulator to be cut to a size ranging from 0.8 mm to 2.0 mm, and the cut intermediate was transferred to a double-cone dryer to be dried at 80° C. to a water content of less than 5% (w/w) to obtain a finished product.

Example 3

In a 1000 L reactor, 500 kg of water, 200 kg of aluminum hydroxide, 25 kg of lithium chloride, 5 kg of Span 60, 0.625 kg of Tween 80, 17 kg of sodium hydroxide, 40 kg of acrylamide 1799, and 7 kg of N,N-methylenebisacrylamide were added and stirred under normal pressure at 60° C. for 2 h. The above slurry was transferred to a 2000 L kneader, and 0.2 kg of ammonium persulfate was added, stirring was started for uniform mixing, heating was performed to 70° C., a reaction was carried out for 2 h, a material was discharged, and transferred to a counter-roll granulator to be cut to a size ranging from 0.8 mm to 2.0 mm, and the cut intermediate was transferred to a double-cone dryer to be dried at 130° C. to a water content of less than 5% (w/w) to obtain a finished product.

Example 4

In a 1000 L reactor, 500 kg of water, 400 kg of industrial grade acidic alumina sol (having an aluminum content of 11.1%), 25 kg of lithium chloride, 20 kg of PEG 20000, 40 kg of methyl acrylate, and 5 kg of TAIC were added, and stirred at 70° C. under normal pressure for 2 h. The above slurry was transferred to a 2000 L kneader, 0.1 kg of azobisisobutyronitrile was added, stirring was started for uniform mixing, heating was performed to 70° C., heat preservation was performed for 2 h, cooling was performed, a material was discharged, and transferred to a counter-roll granulator to be cut to a size ranging from 0.8 mm to 2.0 mm, and the cut intermediate was transferred to a tunnel-type hot air circulating tunnel electric heating apparatus to be dried at 90° C. to a water content of less than 5% (w/w) to obtain a finished product.

Example 5

In a 1000 L reactor, 500 kg of water, 260 kg of aluminium chloride hexahydrate, 7.52 kg of lithium hydroxide, 30 kg of PVP K30, 20 kg of aluminium ore ground to be 100-mesh (less than 0.15 mm) (purchased from Yunnan Wenshan Aluminum Industry, and having an $Al_2O_3$ content of 58.27%), 100 kg of sodium hydroxide, and 40 kg of phenol were added, and stirred at 80° C. under normal pressure for 2 h. The above slurry was transferred to a 2000 L double-cone dryer, and 20 kg of formaldehyde was added, stirring was started for uniform mixing, heating was performed to 80° C., a reaction was carried out for 2 h, a material was discharged, and transferred to a counter-roll granulator to be cut to a size ranging from 0.8 mm to 2.0 mm, and the cut intermediate was transferred to a tunnel-type hot air circulating tunnel electric heating apparatus to be dried at 150° C. to a water content of less than 5% (w/w) to obtain a finished product.

Example 6

In a 1000 L reactor, 500 kg of water, 260 kg of aluminum chloride hexahydrate, 20 kg of lithium hydroxide, 35 kg of PVP K30, 25 kg of lithium ore ground to be 100-mesh (less than 0.15 mm) (purchased from Nanning Biaohong Trade Co., Ltd, and having a $Li_2O$ content of 0.26%), 31 kg of the finished product in Example 1 which was ground to be 100-mesh (less than 0.15 mm), 100 kg of sodium hydroxide, and 40 kg of dextran 2 w were added, and stirred at 90° C. under normal pressure for 1 h, cooling was performed, 7 kg of epichlorohydrin was added, a material was transferred to a kneader to be mixed, heating was performed to 70° C., a reaction was carried out for 0.5 h to be gelatinous, the gelatinous material was transferred to a screw extrusion granulator to produce a suitable particle size, and the cut intermediate was transferred to a tunnel-type hot air circulating tunnel electric heating apparatus to be dried at 90° C. for 6 h to obtain a finished product.

Example 7

In a 1000 L reactor, 500 kg of water, 400 kg of industrial grade acidic alumina sol (having an aluminum content of 11.1%), 25 kg of lithium chloride, 20 kg of PEG20000, and 40 kg of agarose were added, and a reaction was carried out under stirring at 90° C. under normal pressure for 2 h. The above slurry was transferred to a 2000 L kneader, stirring was started for uniform mixing, cooling was performed, and a material was discharged, and transferred to a counter-roll granulator to be cut to a suitable particle size to obtain a finished product.

Comparative Example 1

In a 1000 L reactor, 500 kg of water, 200 kg of aluminum hydroxide, 25 kg of lithium chloride, 17 kg of sodium hydroxide, and 40 kg of polyvinyl alcohol 2399 were added, and stirred at 90° C. under normal pressure for 2 h. The above slurry was transferred to a 2000 L kneader, and 20 kg of adipaldehyde was added, stirring was started for uniform mixing, heating was performed to 70° C., a reaction was carried out for 2 h, a material was discharged, and transferred to a counter-roll granulator to be cut to a size ranging from 0.8 mm to 2.0 mm, and the cut intermediate was transferred to a double-cone dryer to be dried at 130° C. to a water content of less than 5% (w/w) to obtain a finished product.

Comparative Example 2

In a 1000 L reactor, 500 kg of water, 260 kg of aluminum chloride hexahydrate, 17.5 kg of lithium carbonate, 1 kg of PVP K30, 100 kg of sodium hydroxide, 62 kg of acrylamide, and 7 kg of N,N-methylenebisacrylamide were added, and stirred at 60° C. under normal pressure for 2 h. The above slurry was transferred to a 2000 L double-cone dryer, and 0.2 kg of potassium persulfate was added, stirring was started for uniform mixing, heating was performed to 60° C., a reaction was carried out for 2 h, then a material was discharged, and transferred to a counter-roll granulator to be cut to a size ranging from 0.8 mm to 2.0 mm, and the cut intermediate was transferred to a tunnel-type hot air circulating tunnel electric heating apparatus to be dried at 90° C. to a water content of less than 5% (w/w) to obtain a finished product.

Comparative Example 3

In a 1000 L reactor, 500 kg of water, 260 kg of aluminum chloride hexahydrate, 17.5 kg of lithium carbonate, 100 kg of PVP K30, 100 kg of sodium hydroxide, 62 kg of acrylamide, and 7 kg of N,N-methylenebisacrylamide were added, and stirred at 60° C. under normal pressure for 2 h. The above slurry was transferred to a 2000 L double-cone dryer, and 0.2 kg of potassium persulfate was added, stirring was started for uniform mixing, heating was performed to 60° C., a reaction was carried out for 2 h, then a material was discharged, and transferred to a counter-roll granulator to be cut to a size ranging from 0.8 mm to 2.0 mm, and the cut intermediate was transferred to a tunnel-type hot air circulating tunnel electric heating device apparatus to be dried at 90° C. to a water content of less than 5% (w/w) to obtain a finished product.

Comparative Example 4

A JW-LAHS adsorbent purchased from Jiangsu Jiuwu Hi-Tech Co., Ltd. was used as Comparative example 4.

Pore size data detected by using a JW-BK300 specific surface area and pore size analyzer are as follows:

| Sample | Average pore diameter (nm) | Pore volume (ml/g) | Specific surface area (m²/g) |
| --- | --- | --- | --- |
| Example 1 | 2.28 | 0.68 | 515 |

-continued

| Sample | Average pore diameter (nm) | Pore volume (ml/g) | Specific surface area (m²/g) |
|---|---|---|---|
| Example 2 | 5.67 | 0.71 | 456 |
| Example 3 | 6.74 | 0.68 | 426 |
| Example 4 | 9.62 | 0.75 | 408 |
| Example 5 | 1.44 | 0.79 | 523 |
| Example 6 | 10.41 | 0.81 | 556 |
| Example 7 | 4.15 | 0.70 | 466 |
| Comparative example 1 | 0.03 | 0.95 | 598 |
| Comparative example 2 | 0.56 | 0.66 | 530 |
| Comparative example 3 | 5.23 | 0.77 | 498 |
| Comparative example 4 | 0.6 | 0.84 | 566 |

Dissolution Loss Rate Evaluation:

1000 ml of the finished product in each example was measured by using a measuring cylinder, and loaded into an ion exchange column with an inner diameter of 70 mm and a length of 500 mm, 10 bv (1 bv is 1000 ml) of a Qarhan salt lake brine (containing 972 mg/L of $K^+$, 2021 mg/L of $Na^+$, 68 mg/L of $Ca^{2+}$, 116285 mg/L of $Mg^{2+}$, 309 mg/L of B, 56 mg/L of $Li^+$, 296732 mg/L of $Cl^-$, 13911 mg/L of $SO_4^{2-}$, and 10 mg/L of Si, and having a pH of 4.95) was allowed to pass through the column, and then 10 bv of deionized water was allowed to pass through the column, which was 1 cycle, 1000 cycles in total, and then the volume of the finished product in each example was measured again by using a measuring cylinder.

Dissolution loss rate (%) = (the volume of the finished product after 1-1000 cycles (ml)/1000)*100

| Sample | Dissolution loss rate (%) |
|---|---|
| Example 1 | 0.1 |
| Example 2 | 0.5 |
| Example 3 | 0.6 |
| Example 4 | 0.7 |
| Example 5 | 0.9 |
| Example 6 | 0.3 |
| Example 7 | 1.5 |
| Comparative example 1 | 0.5 |
| Comparative example 2 | 0.2 |
| Comparative example 3 | 10.1 |

Application Evaluation:

1000 ml of the finished product in each of the examples and Comparative examples and the sample in each of Example 1, Example 2, and Comparative example 3 after 1000 cycles obtained in the dissolution loss rate evaluation were loaded into an ion exchange column, a Qarhan salt lake brine having a lithium content of 56 ppm (containing 972 mg/L of $K^+$, 2021 mg/L of $Na^+$, 68 mg/L of $Ca^{2+}$, 116285 mg/L of $Mg^{2+}$, 309 mg/L of B, 56 mg/L of $Li^+$, 296732 mg/L of $Cl^-$, 13911 mg/L of $SO_4^{2-}$, and 10 mg/L of Si, and having a pH of 4.95) was allowed to pass through the column at a rate of 20 bv/h (1 bv is 1000 ml), 40 bv of the brine was adsorbed, and a mixed liquid of adsorption tail liquid was collected every 10 bv to detect the lithium content. After the adsorption was completed, 5 bv of the brine was desorbed with deionized water at a flow rate of 20 bv/h, and a desorption mixed liquid was collected every 1 bv for detection. The detection results and the total adsorption amount and the total desorption amount calculated according to a formula (1) and a formula (2) are as follows:

$$\text{Total adsorption amount} = 56*40 - 10*(Li^+ \text{content}_{0\text{-}10\ bv} + Li^+ \text{content}_{10\text{-}20\ bv} + Li^+ \text{content}_{20\text{-}30\ bv} + Li^+ \text{content}_{30\text{-}40\ bv}) \quad (1)$$

$$\text{Total desorption amount} = 1*(Li^+ \text{content}_{1\ bv} + Li^+ \text{content}_{2\ bv} + Li^+ \text{content}_{3\ bv} + Li^+ \text{content}_{4\ bv} + Li^+ \text{content}_{5\ bv}) \quad (2)$$

The detection results are as follows:

| Sample name | Content of lithium ions in adsorption tail liquid mg/L | | | | Total adsorption amount mg/L | Content of lithium ions in desorption liquid mg/L | | | | | Total desorption amount mg/L |
|---|---|---|---|---|---|---|---|---|---|---|---|
| | 0-10 bv | 10-20 bv | 20-30 bv | 30-40 bv | | 1bv | 2bv | 3bv | 4bv | 5bv | |
| Example 1 | 0 | 8 | 19 | 28 | 1690 | 214 | 241 | 164 | 164 | 140 | 923 |
| Example 2 | 1 | 4 | 18 | 21 | 1800 | 222 | 236 | 188 | 176 | 155 | 977 |
| Example 3 | 0 | 10 | 20 | 32 | 1620 | 261 | 244 | 233 | 188 | 166 | 1092 |
| Example 4 | 0 | 12 | 22 | 34 | 1560 | 255 | 264 | 251 | 200 | 177 | 1147 |
| Example 5 | 2 | 10 | 19 | 33 | 1600 | 211 | 233 | 177 | 166 | 144 | 931 |
| Example 6 | 0 | 9 | 22 | 35 | 1580 | 200 | 255 | 211 | 188 | 155 | 1009 |
| Example 7 | 2 | 11 | 23 | 37 | 1510 | 212 | 233 | 188 | 177 | 141 | 951 |
| Comparative example 1 | 12 | 26 | 33 | 38 | 1150 | 95 | 108 | 82 | 82 | 70 | 437 |
| Comparative example 2 | 10 | 22 | 28 | 35 | 1290 | 99 | 152 | 102 | 99 | 84 | 536 |
| Comparative example 3 | 2 | 13 | 24 | 30 | 1550 | 188 | 212 | 155 | 133 | 98 | 776 |
| Comparative example 4 | 0 | 9 | 25 | 40 | 1500 | 150 | 178 | 166 | 123 | 99 | 716 |

-continued

| Sample name | Content of lithium ions in adsorption tail liquid mg/L | | | | Total adsorption amount mg/L | Content of lithium ions in desorption liquid mg/L | | | | | Total desorption amount mg/L |
| --- | --- | --- | --- | --- | --- | --- | --- | --- | --- | --- | --- |
| | 0-10bv | 10-20 bv | 20-30 bv | 30-40 bv | | 1bv | 2bv | 3bv | 4bv | 5bv | |
| Example 1 (after 1000 cycles) | 0 | 10 | 22 | 29 | 1630 | 210 | 234 | 168 | 160 | 143 | 915 |
| Example 2 (after 1000 cycles) | 1 | 3 | 19 | 22 | 1790 | 232 | 225 | 178 | 169 | 149 | 953 |
| Comparative example 3 (after 1000 cycles) | 5 | 22 | 28 | 33 | 1360 | 166 | 165 | 135 | 112 | 105 | 683 |

Through application experiments, it can be found that the lithium adsorbent of the present disclosure has a larger adsorption amount and a larger desorption amount at a high flow rate compared with Comparative examples, a desorption peak is twice that without the addition of the pore-forming agent, and the desorption is more concentrated, and the tailing phenomenon is reduced. Compared with the commercially available sample in Comparative example 4, the lithium adsorbent of the present disclosure has the advantages that the desorption peak is higher and the desorption amount is also larger, which has a significant advantage. As can be seen from the adsorption and desorption data of Example 1, Example 2 and Comparative example 3 after 1000 cycles of use, the samples prepared according to the solution of the present disclosure have a long service life and an attenuation of less than 5% after 1000 cycles of adsorption and desorption.

Obviously, the above examples are merely instances for clarity of illustration and are not intended to limit the embodiments. Other variations or changes in different forms may be made on the basis of the above description for those of ordinary skill in the art. There is no need and cannot be an exhaustive list of all embodiments here. The obvious variations or changes derived therefrom are still within the scope of protection of the present disclosure.

The invention claimed is:

1. A method for preparing a lithium adsorbent, comprising the steps of:
uniformly mixing raw materials comprising a lithium compound, an aluminum compound, a pore-forming agent, a hydrophilic binder and water, and carrying out a reaction at a temperature ranging from 60° C. to 100° C. for 2 h to 4 h so that the lithium compound reacts with the aluminum compound to form an aluminum-based lithium adsorbent active material; wherein a ratio of a total weight of the lithium compound, the aluminum compound and the hydrophilic binder to a weight of the pore-forming agent is 100:(0.6 to 20); and
curing the hydrophilic binder in the raw material mixture, and performing granulating and drying to obtain the lithium adsorbent.

2. The method of claim 1, wherein the aluminum compound is at least one of aluminum chloride, aluminum nitrate, aluminum sulfate, aluminum carbonate, aluminum hydroxide, aluminum oxide and alumina sol.

3. The method of claim 1, wherein the lithium compound is at least one of lithium chloride, lithium carbonate and lithium hydroxide.

4. The method of claim 1, wherein the pore-forming agent is an organic pore-forming agent selected from at least one of polyvinylpyrrolidone, polyethylene glycol, a Span emulsifier and a Tween emulsifier.

5. The method of claim 1, wherein the raw materials further comprise a filler, wherein
a ratio of the total weight of the lithium compound, the aluminum compound and the hydrophilic binder to a weight of the filler is 100:(0 to 20); and
a ratio of a total weight of the lithium compound, the aluminum compound, the hydrophilic binder and the filler to the weight of the pore-forming agent is 100:(0.6 to 20).

6. The method of claim 5, wherein the filler is at least one of lithium ore, aluminum ore and a lithium adsorbent secondary recycling material; and
the filler has a particle size of less than 0.15 mm.

7. The method of claim 1, wherein the hydrophilic binder is at least one of polyacrylamide, polyacrylate, dextran, agarose, polyvinyl alcohol and phenolic resin.

8. The method of claim 1, wherein the raw materials further comprise a curing agent, wherein
the curing agent is selected from at least one of azobisisobutyronitrile, potassium persulfate, ammonium persulfate, sulfuric acid, hydrochloric acid, sodium hydroxide, a dialdehyde compound and epichlorohydrin.

9. The method of claim 8, wherein the dialdehyde compound comprises at least one of glyoxal, malondialdehyde, succinaldehyde, glutaraldehyde and adipaldehyde.

10. The method of claim 1, wherein a molar ratio of the lithium compound to the aluminum compound is 1:(2 to 6).

11. The method of claim 1, wherein a ratio of a total weight of the lithium compound and the aluminum compound to a weight of the hydrophilic binder is 100:(5 to 25).

12. The method of claim 1, wherein a ratio of a total weight of the lithium compound and the aluminum compound to a weight of the water in the raw materials is 1:(1 to 2.5).

13. The method of claim 1, wherein the drying is performed at a temperature ranging from 80° C. to 150° C.

* * * * *